(No Model.)
A. LATHAM.
HOOK AND STUD FOR SHOES.
No. 542,415. Patented July 9, 1895.
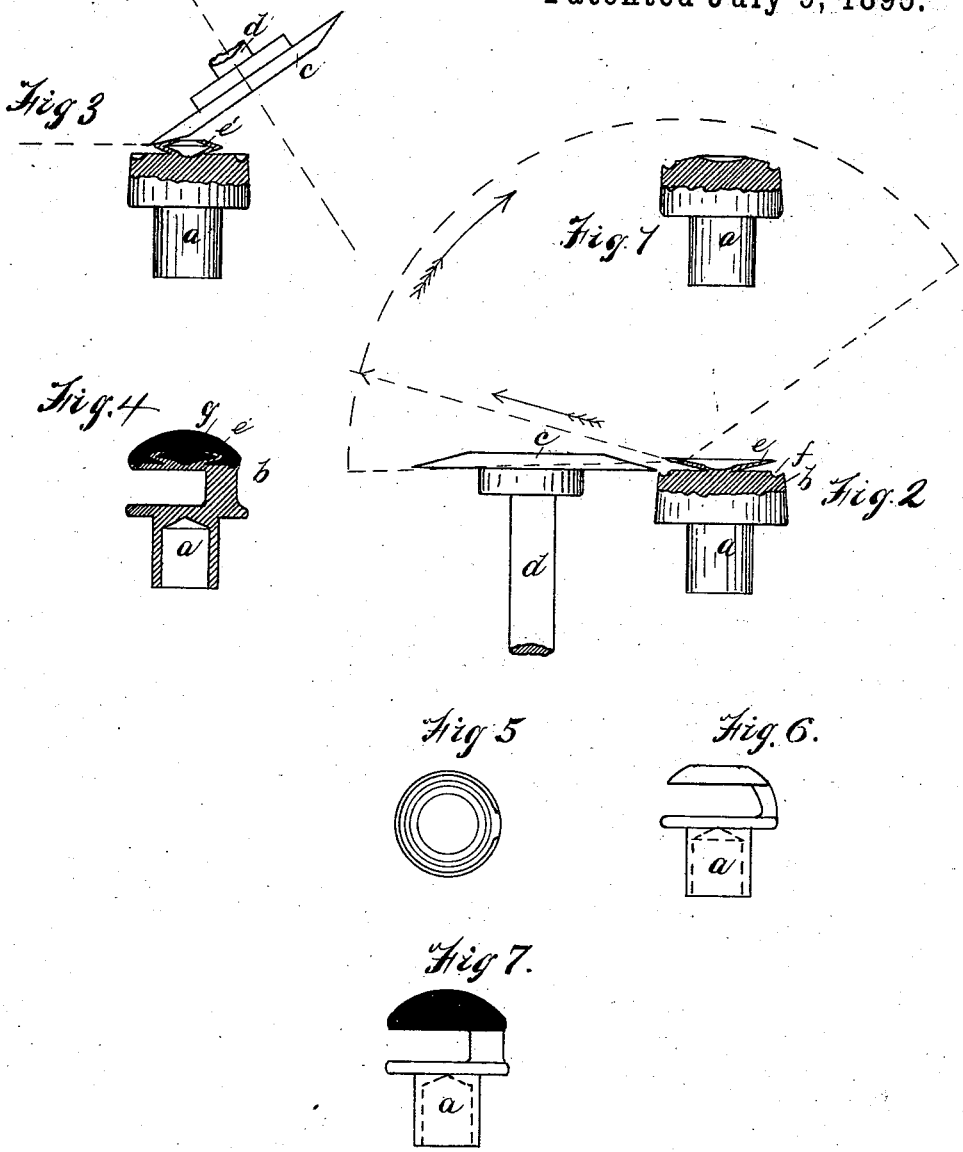
WITNESSES:
E. M. Tower
Willie E. Peters
INVENTOR
Albert Latham
BY Allen Webster
ATTORNEY.

UNITED STATES PATENT OFFICE.

ALBERT LATHAM, OF SPRINGFIELD, MASSACHUSETTS.

HOOK AND STUD FOR SHOES.

SPECIFICATION forming part of Letters Patent No. 542,415, dated July 9, 1895.

Application filed April 29, 1893. Serial No. 472,362. (No model.)

*To all whom it may concern:*

Be it known that I, ALBERT LATHAM, a citizen of the United States of America, residing in Springfield, Hampden county, Massachusetts, have invented new and useful Improvements in Hooks and Studs for Shoes, of which the following is a specification, reference being had to the accompanying drawings, and letters of reference marked thereon, in which drawings like letters of reference indicate like parts.

Figure 1 is a side view of a stud-blank with a part shown in section. Fig. 2 is a like view after the preliminary shearing cut is made.
In this figure I also illustrate the rotary blade or cutter. Fig. 3 is a like view illustrating the position of the rotary blade at the time of finishing the cutting and forming operation. Fig. 4 is a sectional view of a shoe-hook with the plastic material in position. Fig. 5 is a top view of a shoe-hook. Fig. 6 is a side elevation in full lines before the stud or hook has been operated upon, and Fig. 7 is a side elevation illustrating the finished device.
In detail $a$ indicates the shank; $b$, the body portion of the device; $c$, a rotary shear; $d$, a spindle on which the same is mounted; $e$, the annular flange which is cut from the body and thrown upwardly and overturned by the operation of the rotary blades, and $e'$ the inturned edge of the same.

The object of my invention is to provide an improved shoe stud or hook having a coating of plastic material fixed thereon in such manner that it cannot be easily removed, to the end that the color of the stud or hook will always remain the same, and to the end also that by the application of different-colored plastic material studs of different colors may be produced, and having an improved anchorage for the plastic material, and to provide a stud having the advantages above enumerated which shall be comparatively inexpensive, and I accomplish the objects of my invention by the construction herein set forth.

The stud or hook may be of the usual well-known form, and I prefer that the same when struck up be formed with the annular channel or recess $f$, the object of which recess or channel is to give more readily to the finished device a rounded and uniform and finished edge.

The stud or hook is mounted upon a rotating shaft or spindle, and adjacent thereto I mount upon the spindle $d$ a rotary blade $c$, and while both blade and stud are being rapidly rotated the blade is carried toward the stud, causing the material upon the upper surface of the stud to be separated, as indicated in Fig. 2, after which the blade is retracted a short distance, and while both stud and cutter are rotating is moved to the position indicated in Fig. 3, thus turning a part of the cut-away portion of the material over upon itself and forming an inturned annular flange, as indicated in Fig. 4, after which the plastic material indicated by the letter $g$ is applied in any convenient manner, and it is found, when constructed as herein indicated, that the anchorage is sufficient to hold the material firmly in position and prevent all danger after the plastic material becomes hardened of its being separated or detached from the stud or hook.

Having therefore described my invention, what I claim, and desire to secure by Letters Patent, is—

A shoe stud or hook having an outwardly projecting annular flange $e$ and an inturned annular flange $e'$ and a plastic covering within which said flanges are completely embedded substantially as shown.

ALBERT LATHAM.

Witnesses:
ALLEN WEBSTER,
GEO. O. KINGSBURY.